United States Patent
Higginbotham

[15] 3,692,296
[45] Sept. 19, 1972

[54] AIR SPRING SHOCK ABSORBER UNIT

[72] Inventor: William W. Higginbotham, Monroe, Mich.

[73] Assignee: Monroe Auto Equipment Co., Monroe, Mich.

[22] Filed: Dec. 16, 1970

[21] Appl. No.: 98,835

[52] U.S. Cl. .................................................. 267/65
[51] Int. Cl. .............................................. F16f 5/00
[58] Field of Search ....................................... 267/652

[56] References Cited

UNITED STATES PATENTS 3,603,611  10/1971  Wenham ...................... 267/65
3,506,252  4/1970   Wustenhagen .............. 267/65

Primary Examiner—James B. Marbert
Attorney—Harness, Dickey & Pierce

[57] ABSTRACT

An air spring shock absorber unit comprising, a hydraulic direct acting shock absorber, a generally cylindrically-shaped enclosure member extending coaxially around the shock absorber, a flexible diaphragm member connected at one portion thereof to the shock absorber unit and at another portion thereof to the enclosure member and defining a pressurized gas chamber therewith, conduit means for communicating pressurized gas to the chamber through a passage formed in the enclosure member, a fitting assembly for attaching one end of the conduit to the enclosure member and comprising first and second threadably engageable members, the first member being of a generally cup-shaped configuration and including an annular resilient flange portion defining in part a bore adapted for reception of the conduit, the second member having an end portion adapted for engagement with the flange portion whereupon threadable engagement of the first and second members results in the flange portion being biased radially inwardly into tight engagement with the periphery of the conduit; the fitting assembly optionally being provided with a minimum pressure valve mechanism which is adapted to function in maintaining a preselected minimum pressure within the gas chamber of the associated shock absorber unit.

29 Claims, 7 Drawing Figures

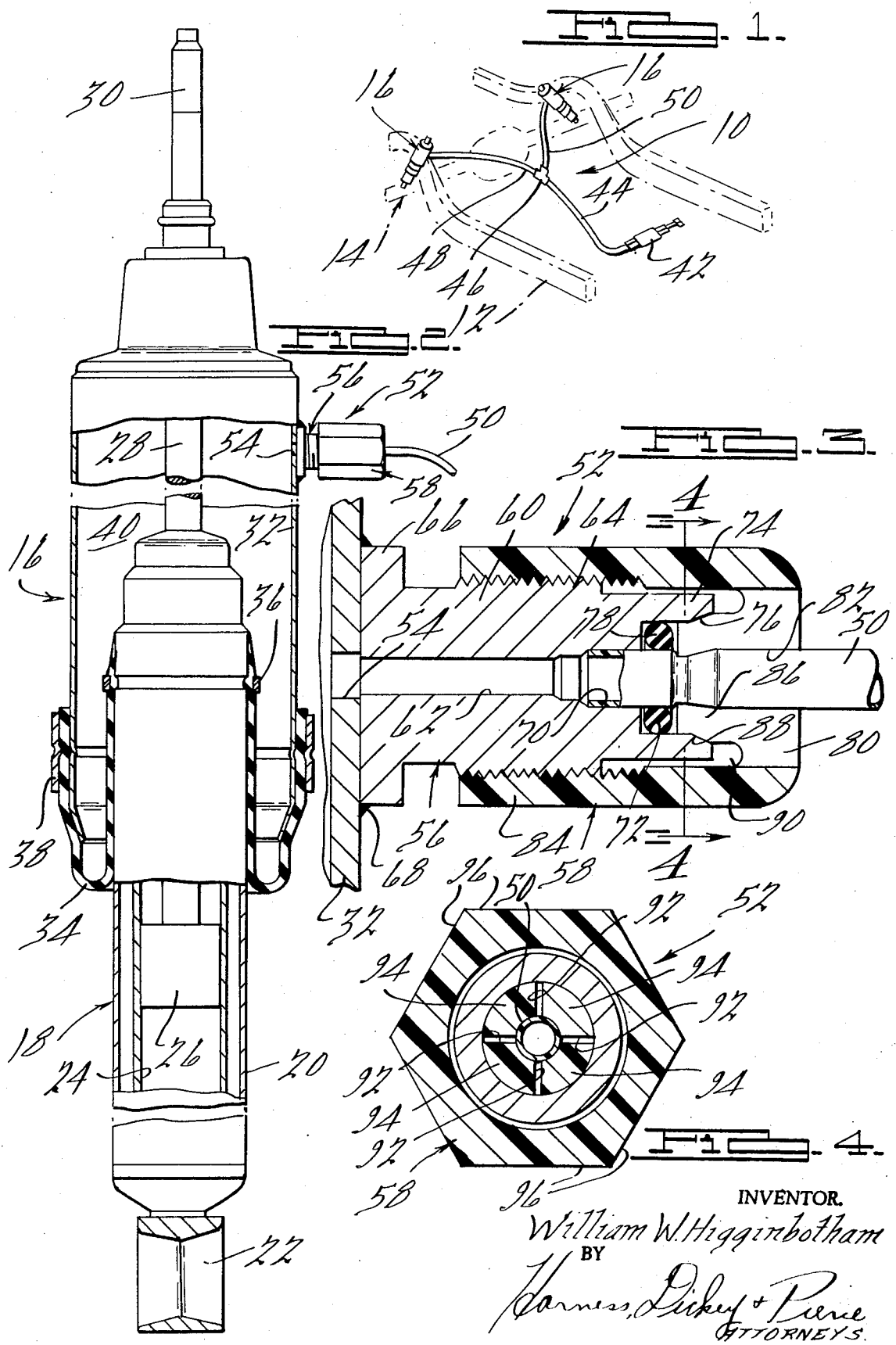

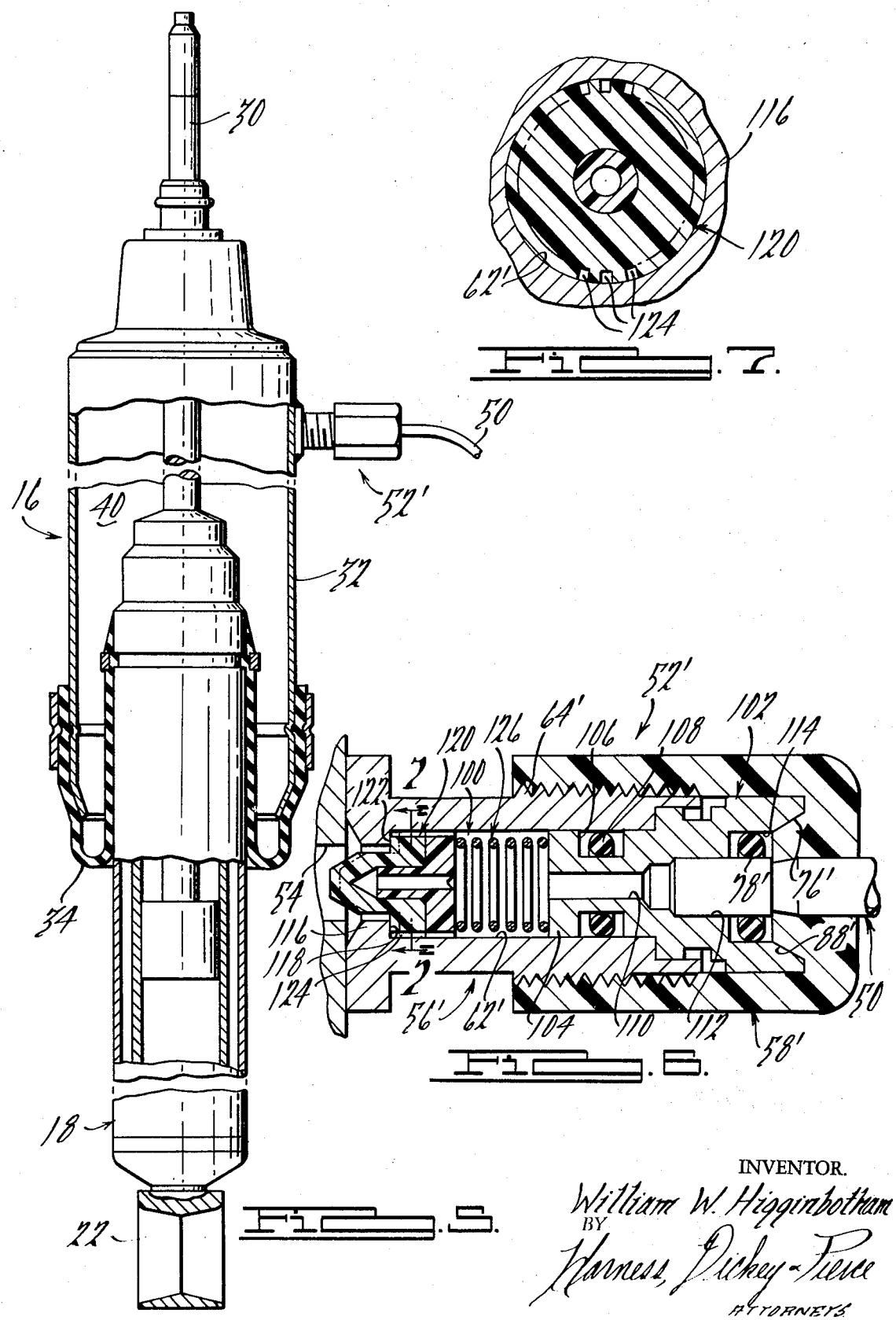

AIR SPRING SHOCK ABSORBER UNIT

SUMMARY OF THE INVENTION

The present invention is directed toward vehicular shock absorbers and more particularly, toward a novel air spring shock absorber and fluid fitting means for positively connecting one end of a pressurized gas conduit to the unit for communicating pressurized gas thereto.

Air spring shock absorber units conventionally consists of a direct acting hydraulic or other type shock absorber having a reciprocal piston rod and adapted for connection between a vehicle frame or chassis and rear axle for controlling and maintaining the rearward end of the chassis and rear axle for controlling and maintaining the rearward end of the chassis in a relatively level attitude, for example, when the vehicle is heavily loaded, Conventionally, a vehicle is provided with two of such air spring shock absorber units, each of which consists of one of the aforementioned hydraulic shock absorbers and a generally cylindrically-shaped enclosure member which typically is connected to the shock absorber piston rod. A generally sleeve-like flexible diaphragm member is provided on the shock absorber and is connected at one end directly to the outer periphery of the shock absorber and at the opposite end to the aforementioned enclosure member, the diaphragm defining with the enclosure, an air chamber which is adapted to be charged with a preselected quantity of air in order to effect expansion and contraction of the unit and thus raising and lowering of the rearward end of the associated vehicle chassis. In accordance with the principles of the present invention, a novel fitting assembly is provided on the exterior of each of the air spring shock absorber units, which assemblies are designed to fixedly secure suitable conduits or tubes that functions to supply pressurized gas of air from a suitable source thereof to the interior of the air chambers. The subject fitting assembly is designed so as to be of an extremely economical construction and thus maintain component costs to a minimum, yet provide for ease in assembly without any sacrifice in effectively attaching the supply conduit to the associated air spring unit.

A second embodiment of the present invention is illustrated wherein a minimum pressure valve mechanism is incorporated interiorly of the aforedescribed fitting assembly. The minimum pressure valve mechanism functions to assure that a predetermined minimum pressure is maintained within the associated shock absorber unit to prevent inadvertent damage thereto which might occur in the event the air chamber thereof is completely evacuated, as will hereinafter be described in detail.

It is accordingly a general object of the present invention to provide a new and improved fitting assembly adapted for operatively securing a pressurized gas or air conduit to an associated air spring shock absorber unit.

It is a more particular object of the present invention to provide a new and improved fitting assembly of the above character which is of an extremely simple design, is economical to manufacture and easy to install.

It is a further object of the present invention to provide a new and improved fitting assembly, as above described, which is designed to be reusable so that a new assembly is not required each time the associated air spring unit is operatively connected to air associated spring conduit.

It is yet a further object of the present invention to provide a new and improved fitting assembly for a vehicular air spring shock absorber unit which has been found to be highly effective to provide a positive gas tight seal at the juncture of a supply conduit and said unit.

It is still another object of the present invention to provide a new and improved fitting assembly of the above character which may be provided with a minimum pressure valve mechanism interiorly thereof.

Other objects and advantages of the present invention will become apparent from the following detailed description taken in conjunction with the accompanying drawings.

BRIEF DESCRIPTION OF THE DRAWINGS

FIG. 1 is an elevated perspective view of a portion of a vehicular leveling system shown in operative association with a schematic representation of a vehicle frame and chassis and embodying the principles of the present invention therein;

FIG. 2 is an enlarged fragmentary cross-sectional view of one of the air spring shock absorber units illustrated in FIG. 1;

FIG. 3 is an enlarged longitudinal cross-sectional view of a fluid fitting assembly incorporated in the air spring shock absorber unit illustrated in FIGS. 1 and 2;

FIG. 4 is a transverse cross-sectional view taken substantially along the line 4—4 of FIG. 3;

FIG. 5 is an enlarged fragmentary cross-sectional view of a shock absorber unit similar to FIG. 2, having a modified embodiment of a conduit fitting assembly in operative association therewith;

FIG. 6 is an enlarged longitudinal cross-sectional view of the fitting assembly shown in FIG. 5; and FIG. 7 is a transverse cross-sectional view taken substantially along the line 7—7 of FIG. 6.

DETAILED DESCRIPTION OF THE PREFERRED EMBODIMENT

Referring now in detail to the drawing and in particular to FIG. 1, a vehicle leveling system, generally designated 10, is shown in operative association with a fragmentary portion of an automobile frame 12 which is operatively associated with a rear axle assembly 14. The frame 12, and hence the chassis (not shown) of the associated vehicle, is adapted to be operatively supported, at least in part upon the axle assembly 14 by means of a pair of leveling units, generally designated 16, which are adapted to function in varying the relative attitude between the vehicle chassis or frame 12 and the axle assembly 14 under various loading conditions, whereby the vehicle chassis may be maintained in a relatively level or horizontal attitude.

Generally speaking, the leveling units 16 are of the gas or fluid actuated type and comprise conventional hydraulic, direct acting shock absorbers 18 which include generally cylindrically-shaped housings 20 having suitable attachment means 22 at the lower end thereof adapted to be secured to the axle assembly 14. The shock absorber housings 20 define internal fluid chambers 24 within which suitable pistons 26 are reciprocally disposed, the pistons 26 being secured to the lower ends of piston rods 28 having attachment means 30 at the upper ends thereof which are intended to be secured to the chassis or frame of the associated vehicle. Each of the units 16 comprises a generally cylindrically-shaped enclosure member 32 which is secured at the upper end thereof to the associated of the piston rods 28. Additionally, each of the units 16 is provided with a flexible diaphragm member 34 which is secured at one end thereof by means of a suitable clamping ring 36 to the outer periphery of the associated shock absorber housing 20, the opposite ends of the diaphragms 34 being secured by suitable clamping rings 38 to the associated of the enclosure members 32 and defining therewith pressurized air chambers 40.

Pressurized gas is adapted to be communicated to the units 16 from a suitable inlet valve or the like 42 located, for example, within the trunk compartment of the associated vehicle, the valve 42 being communicable via a suitable conduit 44, Y-fitting 46 and conduits 48 and 50 with the units 16 as illustrated. By virtue of the fact that various types of fluid or gas operated leveling units may be utilized in the leveling system 10 without departing from the scope of the present invention, a detailed description of the units 16 will be omitted for purposes of simplifying the instant disclosure, it being appreciated that said units 16 are adapted to expand longitudinally upon an increase in fluid or gas pressure within the chambers 40 so as to elevate the rearward end of the frame 12 with respect to the axle assembly 14. Similarly, upon a decrease in pressure in the chambers 40, the units 16 are adapted to contract longitudinally in order to lower the rearward end of the frame 12 with respect to the axle assembly 14.

In accordance with the principles of the present invention, each of the units 16 is provided with a fitting assembly 52 which is adapted to be fixedly secured to the outer side or surface of the associated enclosure members 32 and function to fixedly secure the conduits 48, 50 to the units 16 in a manner such that pressurized gas or fluid may be communicated through suitable inlet passages 54 formed in the members 32, as will hereinafter be described in detail. By virtue of the fact that each of the fitting assemblies 52 are identical in construction and operation, the following detailed description of one of said assemblies 52 will be applicable to each of said assemblies, as will be apparent.

The fitting assembly 52 generally comprises a mounting member 56 and a locking member 58, the former of which comprises a generally cylindrically-shaped body 60 that defines a longitudinally extending bore 62. The member 56 also comprises an externally threaded intermediate portion 64 and a generally radially outwardly extending end portion 66 which is adapted to be fixedly secured to the outer surface of the associated enclosure member 32, as by welding or the like 68, at a position wherein the bore 62 is in registry with the associated passage 54.

The outer end of the bore 62 is formed with an enlarged diameter counterbore 70 which is substantially the same diameter as the associated conduit 48 or 50 and is adapted for reception of one end thereof in the manner best shown in FIG. 3. The counterbore 70 itself is formed with an enlarged diameter counterbore 72 which in part defines a reduced thickness axially extending annular end portion 74 which is formed with a radially inwardly tapered surface 76. The counterbore 72 is adapted to contain a suitable O-ring sealing element 78 which, upon insertion of the end of the conduit 50 into the counterbore 70, is adapted to provide a fluid tight seal between the outer periphery of the conduit 50 and the inner periphery of the counterbore 72 and hence the bore 62.

The locking member 58 is of a generally cup-shaped configuration and comprises an end wall section 80 which defines a central annular bore 82 that is also of substantially the same diameter as the outer diameter of the conduit 50 and is adapted for reception thereof in the manner best shown in FIG. 3. The locking member 58 also comprises an annular side wall section 84 which is internally threaded and formed integral of the end wall section 80 and is thereby adapted for threadable engagement with the mounting member 56 in the manner illustrated. Disposed interiorly of the locking member 58 is an annular, axially extending flange section 86 which is arranged coaxially of the bore 82 and is formed integrally of the end wall section 80. The flange section 86 is formed with a generally radially outwardly tapered surface portion 88 which is of a generally complementary configuration with respect to the tapered surface 76 and is adapted for mating engagement therewith. The surface portion 88 and flange 86 define with the side wall section 84, an annular recess 90 which is adapted for reception of the end portion 74 of the mounting member 56 upon threadable engagement of the members 58, 56. As best seen in FIG. 4, the end wall section 80 of the locking member 58 is formed with four radially outwardly extending, equally circumferentially spaced slits 92 which divide the end wall section 80 and flange section 86 to four segmental portions 94. In accordance with the present invention, the locking member is preferably fabricated of a synthetic polymeric material, such as Nylon, Delrin, etc., whereby the portions 94 will be radially inwardly deformable into positive engagement with the outer periphery of the conduit 50, in the manner hereinafter to be described.

To secure one end of the conduit 50 to the associated unit 16, the locking member 58 is initially threadably advanced onto the threaded intermediate portion 64 of the mounting member 56. The end of the conduit 50 is then inserted through the bore 82 and counterbore 70 to the position shown in FIG. 4. Thereafter, the locking member 58 is rotated, i.e., further threadably advanced, whereby the annular end portion 74 biases the flange section 86 radially inwardly through the interaction of the tapered surfaces 76, 88. As this occurs, the segmental portions 94 move into tight engagement with the outer periphery of the conduit 50 to securely hold the end of said conduit 50 to the associated leveling unit 16. It may be noted that in accordance with a preferred embodiment of the present invention, the outer periphery of the locking member 58 is formed with a plurality of axially extending flat surfaces or facets 96 which permit convenient engagement thereof with a wrench-like tool or the like.

Referring now to FIGS. 5 through 7, a slightly modified embodiment of the above described fitting assembly 52 is illustrated. This embodiment of the aforesaid assembly, hereinafter designated by the numeral 52', is substantially identical in construction and operation as the assembly 52, with the exception that the interior of the assembly 52' is provided with a minimum pressure valve mechanism 100 which is adapted to function in assuring that a predetermined minimum pressure is maintained within the air chamber 40 of the associated leveling unit 16, as will hereinafter be described in detail. By virtue of the fact that basic construction of the assembly 52' is substantially identical to the assembly 52, a detailed description of common component parts thereof will be omitted for purposes of conciseness, with such common parts being designated by like reference numerals having a prime (') suffix.

The assembly 52' comprises a mounting member 56' and a locking member 58', the former of which is adapted to be fixedly secured to an associated leveling unit 16 and defines an internal bore 62' communicable with the passage 54 in said unit 16. The member 56' comprises an externally threaded portion 64' upon which the locking member 58' is adapted to be threadably mounted, whereby to secure one end of an associated conduit 50 to the assembly 52', as above described.

Disposed within the outer or exterior end of the bore 62' is an insert member, generally designated by the numeral 102. The member 102 comprises a generally cylindrically-shaped shank portion 104 having a peripheral recess 106 within which an O-ring sealing member 108 is provided for effecting a fluid tight seal between the inner periphery of the bore 62' and the outer periphery of the member 102. The member 102 defines a longitudinally extending central bore 110, the outer end of which is formed with an enlarged diameter counterbore 112 analogous to the counterbore 70 and adapted to receive one end of the associated conduit 50. The counterbore 112 is in turn formed with another enlarged diameter counterbore 114 which is analogous to the counterbore 72 and is adapted to nestingly receive an O-ring sealing member 78' designed to sealingly engage the outer periphery of the conduit 50, as hereinabove described. The outer end of the counterbore 114 is provided with an inwardly tapered surface 76' cooperable with a surface portion 88' defined interiorly of the locking member 58' for lockingly securing the conduit 50 to the fitting assembly 52', as above described.

The end of the bore 62' opposite the insert member 102 is formed with a radially inwardly projecting shoulder 116 which defines a radially extending surface or valve seat 118. Disposed within the bore 62' adjacent the valve seat 118 is an annular valve member, generally designated 120, which defines a radial surface 122 sealingly engageable with the valve seat 118 to block fluid flow between the passage 54 and the bore 62'. The outer periphery of the valve member 120 is formed with a plurality of serrations 124 through which pressurized fluid may flow when the surface 122 is disengaged from the valve seat 118, as best seen in FIG. 7. The valve member 120 is resiliently urged toward engagement with the shoulder 116 by means of a helical coil spring 126, the outer end of which abuts against the inner end of the insert member 102 and the opposite end of which engages the outer side of the valve member 120, as shown.

In operation of the valve mechanism 100, the valve member 120 is adapted to function as a minimum pressure valve in maintaining a preselected minimum pressure within the air chamber 40 of the associated leveling unit 16. More particularly, it will be seen that the spring 126 will bias the valve member 120 into engagement with the valve seat 118 when the pressure within the chamber 40 acting on the member 120 is less than the effective force of the spring 126 acting against the valve member 120. At such time as the pressure acting on the member 120 exceeds the force of the spring 126, the valve member 120 will be maintained in an "open" position, thereby communicating the interior of the bore 62' with the passage 54 to permit fluid pressure to be communicated from the conduit 50 to the chamber 40. In the event a pressure drop occurs within the chamber 40, for example, when there is a failure in the conduit 50, the spring 126 will bias the valve member 120 toward the left in FIG. 6 to sealingly engage the surface 122 with the valve seat 118 at such time as a predetermined minimum pressure exists within the chamber 40, thereby preventing any further reduction of the pressure within the chamber 40. The size of the spring 126 is, of course, selected so that the minimum pressure maintained within the chamber 40 is such as to prevent any damage to the diaphragm 34 on the associated leveling unit 16 during normal operation of the shock absorber 18 thereof.

While it will be apparent that the preferred embodiments illustrated herein are well calculated to fulfill the objects above stated, it will be appreciated that the present invention is susceptible to modification, variation and change without departing from the scope of the invention.

I claim:

1. An air spring shock absorber unit comprising, a hydraulic direct acting shock absorber, a generally cylindrically-shaped enclosure member extending coaxially around said shock absorber, a flexible diaphragm member connected at one portion thereof to said shock absorber and at another portion thereof to said enclosure member and defining therewith a pressurized gas chamber, conduit means for communicating pressurized gas to said chamber through a passage formed in said enclosure member, a fitting assembly for attaching one end of said conduit to said enclosure member and including first and second threadably engageable members, said first member being of a generally cup-shaped configuration and including an annular resilient flange portion and a bore adapted for reception of said conduit, said second member being fixedly secured to said enclosure member and having an end portion adapted for engagement with said flange portion whereupon threadable engagement of said first and second members results in said flange portion being biased radially inwardly into engagement with the periphery of said conduit.

2. The invention as set forth in claim 1 wherein said first member is formed with a plurality of radially extending slits adjacent said flange portion.

3. The invention as set forth in claim 1 which includes sealing means disposed between the outer periphery of said conduit and the inner periphery of one of said members for providing a seal therebetween.

4. The invention as set forth in claim 1 wherein one of said members is formed of a synthetic polymeric material.

5. The invention as set forth in claim 1 wherein said first and second members have tapered complementary shaped surfaces engageable with one another upon threadable engagement thereof.

6. The invention as set forth in claim 1 wherein said fitting assembly includes valve means for controlling the flow of pressurized gas between said conduit means and said gas chamber.

7. The invention as set forth in claim 6 wherein said valve means is operable for maintaining a preselected minimum pressure within said gas chamber.

8. In combination in a vehicle leveling system,
a pair of air spring shock absorber units each including a hydraulic direct acting shock absorber having generally cylindrically-shaped housing portions which in part define pressurized air spring chambers,
conduit means for supplying pressurized gas to said chambers through passages formed in said housing portions of said units,
a pair of fitting assemblies for selectively securing said conduit means to said housing portions of said units,
each of said assemblies including a first member having a generally cup-shaped portion, an axial bore formed in said first member dimensioned for reception of said conduit, said bore having an internally threaded counterbore in said cup-shaped portion, a second member having a head portion and an externally threaded portion threadably engageable with said counterbore in said first member, said second member further having an axial bore dimensioned to receive said conduit, an annular, generally axially extending flange portion formed integrally of said first member and defining an annular recessed portion with said counterbore portion thereof, said second member having an end portion adapted to be received within said recessed portion upon threaded engagement of the associated of said first and second members, whereby said flange portions are biased radially inwardly into engagement with the periphery of the associated of said conduit means for fixedly securing said conduit means to the respective of said assembly.

9. The invention as set forth in claim 8 wherein said first member is formed with a plurality of radially extending slits adjacent said flange portion, which includes sealing means disposed between the outer periphery of said conduit and the inner periphery of one of said members for providing seal therebetween, wherein one of said members is formed of a synthetic polymeric material, wherein said first and second members have tapered complementary shaped surfaces engageable with one another upon threadable engagement thereof, and wherein said second member is fixedly secured to said enclosure member as by welding.

10. The invention as set forth in claim 8 wherein said fitting assemblies include valve means for controlling the flow of pressurized gas between said conduit means and said gas chambers.

11. The invention as set forth in claim 10 wherein said valve means is operable for maintaining a preselected minimum pressure within said gas chambers.

12. In combination with an air spring shock absorber unit including a generally cylindrically-shaped housing portion in part defining a pressurized air spring chamber, and conduit means for supplying pressurized gas to said chamber through a passage formed in said housing portion,
a fitting assembly for fixedly securing one end of said conduit means to said housing portion at a position whereby pressurized air may be communicated from said conduit through said passage and into said chamber,
said assembly including a first member having a generally cup-shaped portion,
an axial bore formed in said first member dimensioned for reception of said conduit,
said bore having an internally threaded counterbore in said cup-shaped portion,
a second member having a head portion and an externally threaded shank portion threadably engageable with said counterbore in said first member,
said second member further having an axial bore dimensioned to receive said conduit,
an annular, generally axially extending flange portion formed integrally of said first member and defining an annular recessed portion with said counterbore portion thereof,
said second member having an end portion adapted to be received within said recessed portion upon threaded engagement of said first and second members, whereby said flange portion is biased radially inwardly into engagement with the periphery of said conduit for fixedly securing said conduit to said assembly.

13. The invention as set forth in claim 12 wherein said first member is formed with a plurality of radially extending slits adjacent said flange portion.

14. The invention as set forth in claim 12 which includes sealing means disposed between the outer periphery of said conduit and the inner periphery of one of said members for providing gas tight seal therebetween.

15. The invention as set forth in claim 12 wherein one of said members is formed of a synthetic polymeric material.

16. The invention as set forth in claim 12 wherein said first and second members have tapered complementary shaped surfaces engageable with one another upon threadable engagement thereof.

17. The invention as set forth in claim 12 wherein said second member is fixedly secured to said enclosure member as by welding.

18. The invention as set forth in claim 12 wherein said fitting assembly includes valve means for controlling the flow of pressurized gas between said conduit means and said gas chamber.

19. The invention as set forth in claim 18 wherein said valve means is operable for maintaining a preselected minimum pressure within said gas chamber.

20. The invention as set forth in claim 12 wherein said first member is formed with a plurality of radially extending slits adjacent said flange portion, which includes sealing means disposed between the outer periphery of said conduit and the inner periphery of one of said members for providing seal therebetween, wherein one of said members is formed of a synthetic polymeric material, wherein said first and second members have tapered complementary shaped surfaces engageable with one another upon threadable engagement thereof, and wherein said second member is fixedly secured to said enclosure member as by welding.

21. In combination with an air spring shock absorber unit including means defining a pressurized chamber and conduit means for supplying pressurized gas to said chamber,
a combination fitting and valve assembly for securing one end of said conduit to said unit and for maintaining a preselected minimum pressure interiorly of said chamber.

22. The invention as set forth in claim 21 which includes passage means communicating said conduit and said chamber, and which further includes a valve element and means biasing said element toward a position closing said passage but permitting said element to be maintained in a position opening said passage in response to a predetermined pressure condition within said chamber.

23. The invention as set forth in claim 22 which includes a first member of generally cup-shaped configuration and including an annular resilient flange portion and a bore adapted for reception of said conduit means; a second member supported in said passage means and having an end portion adapted for engagement with said flange portion; and means associated with one of said members for biasing said flange portion radially inwardly into engagement with the periphery of said conduit.

24. The invention as set forth in claim 23 which includes sealing means disposed between the outer periphery of said conduit and the inner periphery of one of said members for providing a seal therebetween.

25. The invention as set forth in claim 23 which includes a third member at least partially defining said passage means and threadably connected to one of said members.

26. The invention as set forth in claim 25 wherein said first and second members have tapered complementary shaped surfaces engageable with one another upon threadable engagement of said third member with one of said members.

27. The invention as set forth in claim 23 wherein said means for biasing said element includes a spring interposed between said element and said second member.

28. The invention as set forth in claim 23 which includes seal means disposed between the outer periphery of said second member and the inner periphery of said passage means for providing a seal therebetween.

29. The invention as set forth in claim 21 wherein said assembly comprises a mounting member having a first end portion connected to said shock absorber, and including an axial bore in communication with said pressurized chamber; valve means located in said bore for maintaining a preselected minimum pressure in said chamber; an insert member at least partially located in said bore and having an end portion extending outwardly from an opposite end of said mounting member; and a locking member of generally cup-shaped configuration threadably connected to said mounting member, said locking member including an annular resilient flange portion adapted for engagement with said end portion of said insert member, and a bore adapted for reception of said conduit means whereupon threadable engagement of said mounting and locking members results in said flange portion being biased radially inwardly into engagement with the periphery of said conduit.

* * * * *